United States Patent [19]

Vaillant de Guelis et al.

[11] Patent Number: 4,924,128
[45] Date of Patent: May 8, 1990

[54] HIGH-EFFICIENCY ELECTRIC MOTOR WITH LOW TORQUE VARIATION

[75] Inventors: Hubert Vaillant de Guelis, Aubergenville; Patrice Jamain, Maule; Jean-Pierre Roland, Vetheuil, all of France

[73] Assignee: Aerospatiale Societe Nationale Industrielle, Paris, France

[21] Appl. No.: 285,490

[22] Filed: Dec. 16, 1988

[30] Foreign Application Priority Data

Dec. 16, 1987 [FR] France .................. 87 17556

[51] Int. Cl.⁵ .................. H02K 21/12
[52] U.S. Cl. .................. 310/156; 310/12; 310/90.5; 310/105; 310/180; 310/266; 318/254
[58] Field of Search .................. 310/90.5, 105, 266, 310/153, 156, 12, 180, 13, 208; 318/254; 200/61.39

[56] References Cited

U.S. PATENT DOCUMENTS

| | | |
|---|---|---|
| 3,955,858 | 5/1976 | Poubeau . |
| 4,211,452 | 7/1980 | Poubeau . |
| 4,363,525 | 12/1982 | Poubeau .................. 310/90.5 |
| 4,439,702 | 3/1984 | Belikow .................. 310/12 |
| 4,444,444 | 4/1984 | Benedetti .................. 310/90.5 |
| 4,629,265 | 12/1986 | Hamilton .................. 310/90.5 |
| 4,785,212 | 11/1988 | Downer .................. 310/90.5 |

FOREIGN PATENT DOCUMENTS

| | | |
|---|---|---|
| 0054617 | 6/1982 | European Pat. Off. .......... 310/90.5 |
| 072747 | 8/1982 | European Pat. Off. . |
| 2358030 | 5/1975 | Fed. Rep. of Germany . |
| 72591 | 4/1960 | France . |

OTHER PUBLICATIONS

Patent Abstracts of Japan, vol. 7, No. 99, Apr. 27, 1983.
JP-A-58 22 571, Sept. 2, 1983.
Patent Abstracts of Japan, vol. 9, No. 266(E-352), Oct. 23, 1985.
JP-A-60 113 647, June 20, 1985.

Primary Examiner—R. Skudy
Attorney, Agent, or Firm—Browdy & Neimark

[57] ABSTRACT

A polyphase electric motor including a body mobile relative to a fixed body, one of these bodies carrying an exciter strip formed by a plurality of alternating coil windings aligned with each other and connected to an energizer device including a switch adapted to excite the pluralities of coils alternately, the other body comprising a row of alternating magnets and, one on each side of this row, two magnetic bars determining along the row an airgap of constant width in which the exciter strip is disposed. The permanently magnetized row is disposed parallel to the magnetization directions of the magnets constituting it between two continuous magnetic plates.

7 Claims, 3 Drawing Sheets

HIGH-EFFICIENCY ELECTRIC MOTOR WITH LOW TORQUE VARIATION

BACKGROUND OF THE INVENTION

1. Field of the Invention

The present invention concerns an electric motor the "coreless" type.

2. The Prior Art

An electric motor of this kind is often a rotary (or circular) device but may equally well be a linear device.

Where a motor of this kind is used in space, it is often associated with one or more magnetic bearings.

In practice attempts are made to minimise the energy consumption of magnetic bearings, which entails reducing disturbances as much as possible, in particular disturbances caused by the associated motors. To this end "coreless" motors are preferred over "cored" motors, the major disadvantage of which is their radial stiffness.

A classic but non-limiting application of these "coreless" motors concerns the magnetic bearings of satellite wheels, where the environment is severe in terms of vacuum and the permissible temperature range.

Motors of this kind are described, for example, in U.S. Pat. Nos. 3.955.858 and 4.211.452.

These three-phase rotary type motors incorporate a rotor mobile in rotation relative to a stator. The stator carries a cylindrical exciter strip coaxial with the rotor formed by a threefold plurality of alternating coil windings connected in series within each plurality and circumferentially aligned with each other. These pluralities of windings, each corresponding to one electrical phase, are connected each to a respective current source through a switch adapted to pass current through them in an alternating manner. The exciter strip is disposed in an annular airgap along a ring of permanent magnets magnetised in alternate radial directions with their magnetic fields closed by magnetic closure rings disposed on each radial side of the airgap and the ring of permanent magnets.

The currents flowing in the pluralities of windings interact with the magnetic fields of the magnets to generate a motor torque defined by LAPLACE's law.

In practice the permanent magnets are offset relative to each other in the circumferential direction in order to minimise the EDDY currents (which are very high in large-diameter motors because of the high rotor/stator relative speeds), which results in a non-negligible fluctuation in the motor torque because of switching between successive electrical phases.

SUMMARY OF THE INVENTION

An object of the invention is to reduce very substantially the fluctuation in the motor torque and to reduce the phenomena of drag generated by the EDDY currents, and thus to increase the efficiency of the motor even if the magnets of the rotor are very close to the metal parts of the stator.

To this end the invention proposes, in a very general way, a multiphase electric motor comprising a body mobile with one degree of freedom along a path relative to a fixed body. One of the bodies carries an exciter strip formed by a set of pluralities of alternately would coils aligned with each other and incorporate runs perpendicular to the path. There is, one plurality of coils per electrical phase. The exciter strip is connected to an energiser device including a switch adapted to excite the pluralities of coils alternately. The, other body incorporates, a row formed by a twofold plurality of magnets magnetised transversely to the path and in alternate magnetisation directions and, on either side of this row, two magnetic bars defining along the row an airgap of constant width in which the exciter strip is disposed. The, motor is characterised in that the permanently magnetised row is disposed, parallel to the magnetisation directions of the magnets which constitute it, between two continuous plates of a soft magnetic material.

An arrangement of this kind makes it possible to reduce the EDDY current losses because of the additional magnetic parts which close the magnetic fields, so avoiding those losses.

The magnets may then be mounted contiguously at the periphery of the motor, which has the advantage of avoiding the use of magnets too close to their ends, where the magnetic field weakens. The lengthening of the magnetic sectors, as a result of their contiguous arrangement, makes it possible to obtain in each sector a larger area in which the magnetic field is constant and so to create a constant motor torque over a larger rotation angle. This advantage makes it possible to achieve an overlap of the motor torque between phases virtually without loss of torque and therefore without fluctuation in the torque.

Depending on requirements, the motor in accordance with the invention is of the linear or rotary type, the coils and the magnets being respectively carried by the stator and the rotor or vice versa.

Its operation is not adversely affected by vacuum and/or temperature.

The motor in accordance with the invention may incorporate several magnet+coil groups for reasons of redundancy and/or guidance.

BRIEF DESCRIPTION OF THE DRAWINGS

Other objects, characteristics and advantages of the invention will emerge from the following description given by way of non-limiting illustrative example with reference to the appended drawings, in which.

DETAILED DESCRIPTION OF THE PRESENT INVENTION

Figure 1:
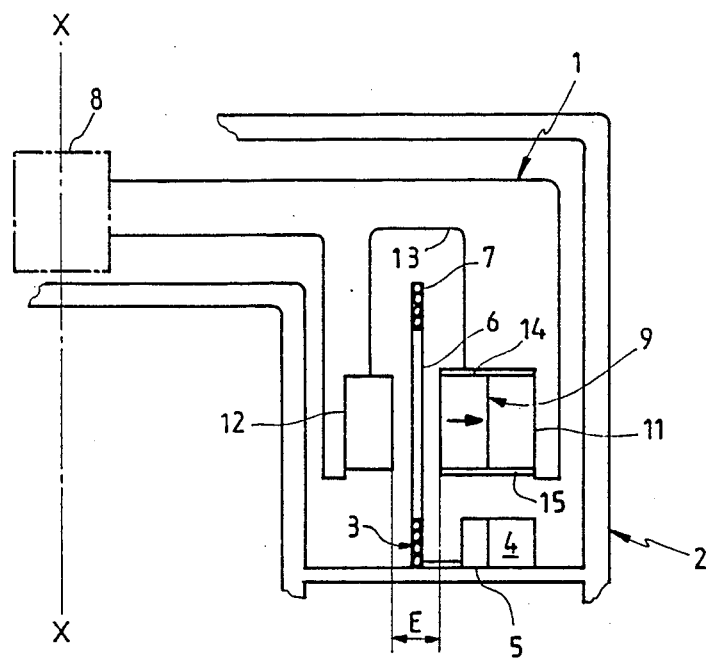
FIG. 1 is a partial schematic half-view in axial cross-section of a "coreless" motor in accordance with the invention.
Figure 2:
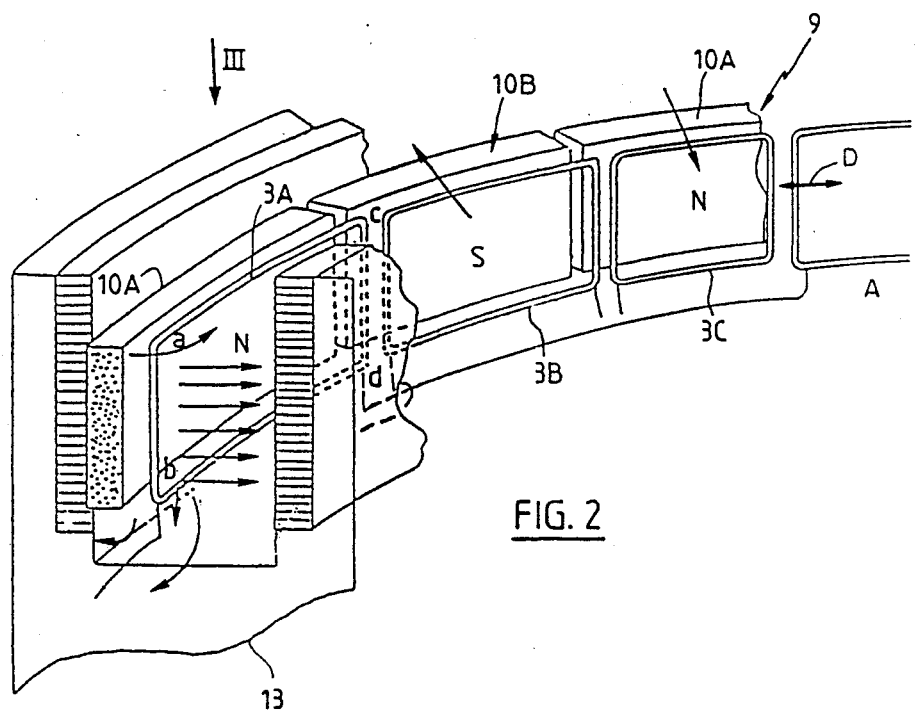
FIG. 2 is a partial view of it in perspective.
Figure 3:
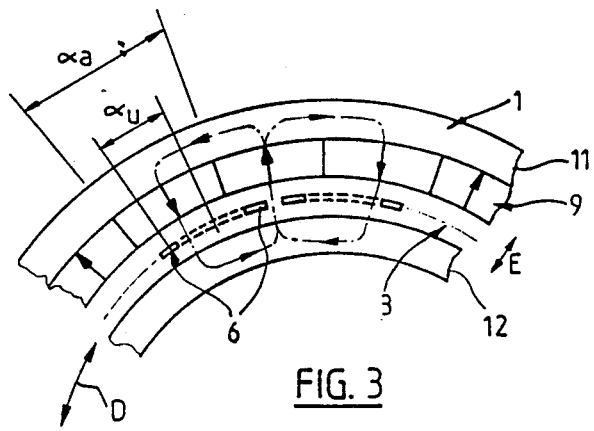
FIG. 3 is a partial schematic view of it as seen in the direction of the arrow III in FIG. 2.

FIGS. 1 through 3 show in a schematic way a "coreless" electric motor in accordance with the invention comprising a rotor 1 mobile in rotation along a path D about an axis X—X relative to a fixed structure 2 forming a stator.

The fixed structure 2 includes a casing determining a volume of axial symmetry about X—X within which the rotor rotates.

Fixed to the fixed structure in a known way is a cylindrical exciter strip 3 formed by a threefold plurality of alternating coil windings 3A, 3B, 3C disposed in circumferential alignment with each other (see FIG. 2) so as to form an annular series of coils ABCABCA..., all the coils A (or B or C) of one of the pluralities being electrically connected to each other and defining one electrical phase of the motor (so that in this instance the motor is a three-phase motor). The three phases A, B and C are supplied with electric power separately from each other and without any discontinuity by an energiser device schematically represented at 4 and in accordance with instructions given by a switch schematically represented at 5 depending on the relative angular position of the rotor and stator as sensed by sensors (not shown).

Here the coils are substantially rectangular in shape and incorporate axial runs or wires 6 connected to circumferential runs or wires 7.

The structure of the exciter strip 3 and of the energiser device 4 is well known, in particular from the previously mentioned documents, and will not be described in more detail here.

The rotor 1 is guided in rotation and held axially and radially by magnetic bearings of any appropriate type schematically represented at 8.

It includes facing radially towards the exciter strip 3 a permanently magnetised ring 9 formed in a known way by an annular series of permanent magnets 10A, 10B, with radial magnetisation of the same magnitude but with a magnetisation direction that is reversed from one magnet 10A to the next 10B.

The alternately magnetised magnets are substantially contiguous.

Running alongside the permanently magnetised ring 9 is a ring 11 of magnetic material and another ring 12, also of magnetic material, is offset radially relative to the magnetised ring 9, on the side opposite the magnetic ring 11, so as to define a radial airgap E of constant thickness in which the exciter strip 3 is disposed. This is best seen in FIG. 3.

The rings 9, 11 and 12 are carried by an amagnetic material flywheel 13 situated above the airgap in FIG. 1 and below it in FIG. 2.

In the example shown the magnetised ring 9 is radially outside the airgap E.

Annular plates 14 and 15 of soft magnetic material are disposed one on each side of the magnetised ring 9 in the axial direction.

Here these plates are extended radially so that they also lie one on each side of the adjacent magnetic ring 11 which has the same axial dimension as the magnetised ring 9.

As seen in FIG. 3, the magnetic field of each magnet 10A or 10B is closed transversely to the axis X—X through the magnetic rings 11 and 12 and through the adjacent magnets 10B or 10A.

Thanks to the annular plates 14 and 15 the leakage flux is also closed parallel to the axis X—X.

The magnets occupy equal-size angular sectors of amplitude $\alpha a$. Their substantially constant radial magnetic field is in practice weakened near their axial edges.

Figure 4:
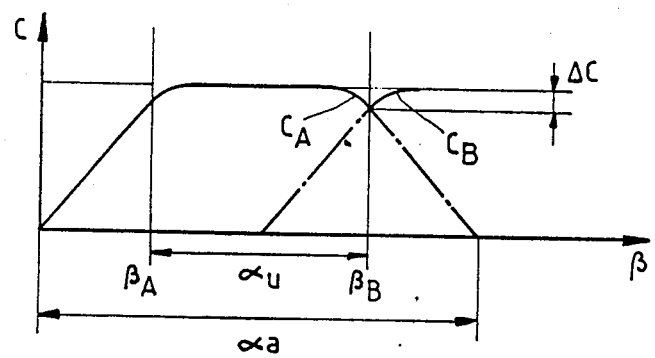
FIG. 4 is a graph showing for this motor the motor torque C as a function of the angle $\beta$ between the rotor and the stator.

When the coils of the same phase, for example the coils 3A, are supplied with current (and not with voltage) under the control of the switch 5, the current flowing in the axial runs 6 interacts with the magnetic field of the facing magnets to generate a force the direction and magnitude of which are determined by LAPLACE's law. The result is a torque $C_A$ applied to the rotor; the curve $C_A$ in FIG. 4 shows how this changes with the relative angle $\beta$ between the rotor and the stator. The subsequent energisation of the coils 3B generates in a similar way a torque shown by the curve $C_B$.

Let $\beta_A$ represent the angular rotor/stator position for which the switch triggers energisation of phase A and $\beta_B$ represent the position for which energisation of phase B is triggered. The offset $\alpha_u$ between these angular positions defines a useful angle of each phase.

Near the values $\beta_A$ and $\beta_B$ there is for $C_A$ and $C_B$ a loss of torque $\Delta C$ due to the proximity of the end of the magnet relative to the runs 6 in question. The smaller $\alpha_u$ is relative to $\alpha_a$ the smaller is this loss.

The torque losses $\Delta C$ produce a fluctuation in the overall motor torque C the amplitude of which depends on:

the ratio $\alpha_u/\alpha_a$, and
the gradient of the switching speed and current rise for each phase.

The reduce the amplitude of this fluctuation the shape of the curve $C_A$ or $C_B$ must be as near rectangular as possible, meaning that $\alpha_u$ must be small in relation to $\alpha_a$. This makes it possible to avoid using the circumferential ends of the magnet. This is achieved by arranging the magnets contiguously.

The ratio $\alpha_u/\alpha_a$ is preferably chosen to have a value between $\frac{1}{2}$ and $\frac{2}{3}$, preferably $\frac{1}{2}$ for four-phase motors and $\frac{2}{3}$ for three-phase motors.

The closure magnetic plates 14 and 15 absorb the fluctuations in magnetic flux between the contiguous magnets, so minimising the EDDY currents which arise in the stator and slow the rotor. The presence of these plates makes it possible to reduce by a factor of approximately 10 the braking forces due to the proximity to the rotor of the metal parts of the stator.

Figure 5:
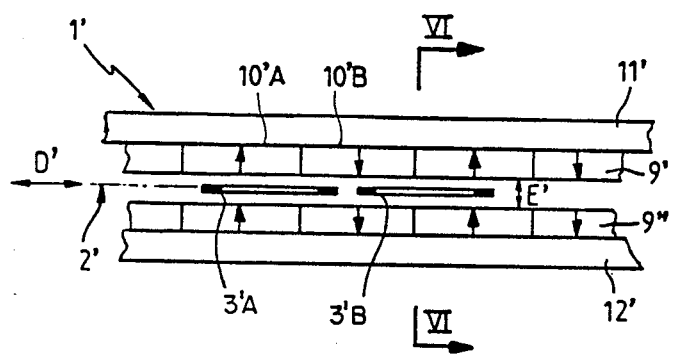
FIG. 5 is a view similar to that of FIG. 3 for a linear motor in accordance with the invention.
Figure 6:
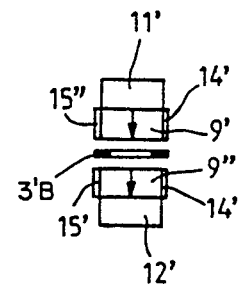
FIG. 6 is a partial view of it in cross-section on the line VI—VI in FIG. 5.

FIGS. 5 and 6 show another example of a motor in accordance with the invention, of the linear type.

Coils 3'A, 3'B, 3'C define in it an exciter strip parallel to a substantially plane path D' disposed in an airgap E', here delimited by two rows 9' and 9" of permanent magnets with alternating transverse magnetisation (a single row could suffice), the magnets 10'A, 10'B of each row having the same magnetisation direction as the magnets facing them. The magnetised rows 9' and 9" each have magnetic bars 11' and 12' running along them opposite the airgap E' and are disposed between magnetic plates 14' and 15' for closing the leakage flux. These plates do not in this instance extend so far as to lie one on each side of the bars 11' and 12', but this would be feasible.

The same amplitude relationships denoted $1_a$ and $1_u$ (linear amplitude) apply here.

In fact, in a very general way, in the case of contiguous magnets and by design the ratio $\alpha_u/\alpha_a$ takes the value $\frac{2}{3}$ for three phases and $\frac{1}{2}$ for four phases.

If R is the average radius of the magnets, for maximum reduction of the field loss phenomenon at the end of the magnets it is necessary for the value $(\alpha_u - \alpha_a).R/2$ to be as high as possible (in the case of a linear motor the expression $(1_u - 1_a)/2$ is substituted).

There are three ways to achieve this:
to increase the average radius R,
to increase the number of phases,
to use contiguous magnets (and plates 14 and 15 to eliminate EDDY currents).

The more poles there are, the more windings there are per phase.

It is obvious that multiple variant embodiments may be put forward by those skilled in the art without departing from the scope of the invention. For example, the exciter coils could be carried by a mobile member and the magnets could be carried by a fixed member. Likewise, a plurality of magnet-coil assemblies may be mounted between a mobile member and a fixed member, one above the other or side by side, possible in contact and even comprising common parts (magnets and/or various magnetic bars and plates).

We claim:

1. A multiphase electric motor comprising:
   a fixed body;
   a body mobile with one degree of freedom along a path relative to the fixed body;
   an exciter strip carried by one of the bodies formed by a set of pluralities of alternately wound coils aligned with each other and incorporating runs perpendicular to the path, there being one plurality of coils per electrical phase, the exciter strip being connected to an energiser device including a switch adapted to excite the pluralities of coils alternately;
   at least one row incorporated by the other body and formed by a twofold plurality of magnets magnetised transversely to the path and in alternate magnetisation directions and two magnetic bars provided on either side of this row and defining along the row an airgap of constant width in which the exciter strip is disposed; a permanently magnetised row being disposed, parallel to the magnetisation directions of the magnets and disposed, between two plates of a soft magnetic material.

2. The motor according to claim 1, the exciter strip is carried by the fixed body and the permanently magnetised row, the bars the magnetic plates are carried by the mobile body.

3. The motor according to claim 1, wherein the at least one row comprises two permanently magnetised rows one on each side of the airgap.

4. The motor according to claim 1, wherein the plates, between which the at least one permanently magnetised row is disposed, are extended so that an adjacent one of said two magnetic bars is also disposed between them.

5. The motor according to claim 1, wherein the mobile body is a rotor mobile in rotation relative to the fixed body forming a stator, and wherein the permanently magnetised row, the exciter strip, the bars and the plates are annular in shape.

6. The motor according to claim 1, wherein the mobile body moves along a linear path relative to the fixed body.

7. The motor according to claim 1, wherein the ratio of the amplitude of each magnet to that of the angular sector of a useful angle of each phase or is between 3/2 and 2/1.

* * * * *